(12) United States Patent
Costin et al.

(10) Patent No.: US 7,377,750 B1
(45) Date of Patent: May 27, 2008

(54) LIGHTNING PROTECTION SYSTEM FOR A WIND TURBINE

(75) Inventors: Daniel P. Costin, Chelsea, VT (US); Jeffrey K. Petter, Williston, VT (US)

(73) Assignee: Northern Power Systems, Inc., Waitsfield, VT (US)

( * ) Notice: Subject to any disclaimer, the term of this patent is extended or adjusted under 35 U.S.C. 154(b) by 451 days.

(21) Appl. No.: 11/085,748

(22) Filed: Mar. 21, 2005

Related U.S. Application Data (60) Provisional application No. 60/554,688, filed on Mar. 19, 2004.

(51) Int. Cl.
*F03D 11/00* (2006.01)

(52) U.S. Cl. ............... 416/146 R; 361/220; 416/230; 416/225

(58) Field of Classification Search ............... 361/216, 361/220; 416/146 R, 224, 225, 229, 230; 290/55
See application file for complete search history.

(56) References Cited

U.S. PATENT DOCUMENTS

| | | | |
|---|---|---|---|
| 2,982,494 A | 5/1961 | Amason | 244/1 |
| 4,161,370 A | 7/1979 | Oppolzer | 416/17 |
| 4,587,592 A | 5/1986 | Nakano et al. | 361/127 |
| 5,499,782 A | 3/1996 | Domine | 244/1 |
| 5,542,624 A | 8/1996 | Smith | 244/1 |
| 5,574,613 A | 11/1996 | Shirakawa et al. | 361/117 |
| 5,716,193 A | 2/1998 | Mondet et al. | 416/134 |
| 6,407,900 B1 | 6/2002 | Shirakawa et al. | 361/117 |
| 6,457,943 B1 | 10/2002 | Olsen et al. | 416/230 |
| 6,932,574 B2 * | 8/2005 | Wobben | 416/146 R |
| 7,186,086 B2 * | 3/2007 | Yoshida | 416/146 R |

FOREIGN PATENT DOCUMENTS

| | | |
|---|---|---|
| DE | 4436197 | 4/1996 |
| DE | 4445899 | 6/1996 |
| DE | 19748716 | 11/1998 |
| EP | 0707145 A1 | 4/1996 |
| EP | 1154537 | 11/2001 |
| JP | 2002227757 | 8/2002 |
| WO | WO94/25752 | 11/1994 |
| WO | WO00/79128 A1 | 6/2000 |
| WO | WO02/48546 A1 | 6/2002 |

OTHER PUBLICATIONS

Lightning Protection for Wind Turbine Installations; Chapter 9, Stephen Haigh, Emilio Garbagnati, Eduard Muljadi, Aage Pedersen, Hans Steinbigler, Johs. Wiesinger; IEA Recommended Practices for Wind Turbine Testing and Evaluation; 1997; IEC 61400-24; pp. 1-29

Wind Turbine Generator Systems; Part 24: Lightning Protection; TS 61400-24 IEC(E); Jul. 2002; pp. 1-69.

* cited by examiner

*Primary Examiner*—Edward K. Look
*Assistant Examiner*—Dwayne J White
(74) *Attorney, Agent, or Firm*—Downs Rachlin Martin PLLC (57) ABSTRACT

In a wind turbine (104, 500, 704) having a plurality of blades (132, 404, 516, 744) and a blade rotor hub (120, 712), a lightning protection system (100, 504, 700) for conducting lightning strikes to any one of the blades and the region surrounding the blade hub along a path around the blade hub and critical components of the wind turbine, such as the generator (112, 716), gearbox (708) and main turbine bearings (176, 724).

22 Claims, 5 Drawing Sheets

LIGHTNING PROTECTION SYSTEM FOR A WIND TURBINE

RELATED APPLICATION DATA

This application claims the benefit of priority of U.S. Provisional Patent Application Ser. No. 60/554,688, filed Mar. 19, 2004, and titled "Lightning Protection System For A Direct Drive Wind Turbine," that is incorporated by reference herein in its entirety.

FIELD OF THE INVENTION

The present invention generally relates to the field of wind turbines. In particular, the present invention is directed to a lightning protection system for a wind turbine.

STATEMENT REGARDING FEDERALLY SPONSORED RESEARCH OR DEVELOPMENT:

This invention was made with Government support under Contract DE-AC36-98GO10337 awarded by the Department of Energy. The Government may have certain rights in this invention.

BACKGROUND OF THE INVENTION

Lightning is a major source of wind turbine component failures. The conventional art of lightning protection is well documented by the international standard IEC 61400-24. In general, the lightning protection system addressed by this standard uses blade conductors connected to the blade rotor hub, which is connected to the main shaft. In turn, the main shaft is connected via slip rings or spark gap to a bed plate, which is connected to the tower via slip rings or spark gap. This system works reasonably well for generators having a gearbox, since an insulating coupling can be used between the gearbox and generator to inhibit lightning from reaching the generator, which is expensive and easily damaged. The drivetrain bearings are difficult to protect adequately, however, since the conductive roller bearings are in contact with the main shaft, which is also conductive. Also, the gears within the gearbox are difficult to protect adequately for the same reason. Pitting of bearing and gear surfaces is the likely result of lightning strikes to this type of protection system.

Such a protection system is generally impractical for a direct-drive wind turbine, however, since it is difficult to isolate the blade rotor from the generator rotor because they are directly connected to each other and are virtually universally made of conductive material, i.e., metal, due to the large loads present. Consequently, the generator of a direct-drive wind turbine is susceptible to damage from lightning strikes to the blades and hub of the blade rotor. While lightning protection systems have been designed to conduct lightning striking the blades away from the generator of a direct-drive wind turbine, lightning strikes to the blade rotor hub remain a large threat to the generator.

SUMMARY OF THE INVENTION

In one aspect, the present invention is directed to a wind turbine. The wind turbine comprises a wind rotor comprising a wind rotor hub and a plurality of blades attached to the wind rotor hub. The wind rotor hub has a rotational axis and first and second sides spaced from each other along the rotational axis. Each of the plurality of blades includes a non-conductive portion proximate the blade rotor hub and at least one conductive portion radially outward from the rotational axis beyond the non-conductive portion. An electrically grounded structure is located on the second side of the wind rotor hub and is stationary about the rotational axis when the wind rotor is in use. A lightning conducting path of least electrical resistance extends from the at least one conductive portion of each of the plurality of blades to the electrically grounded structure. The lightning conducting path spaced from the wind rotor hub so as to inhibit arcing between the lightning conducting path and the wind rotor hub.

In another aspect, the present invention is directed to a wind turbine. The wind turbine comprises a blade rotor hub having a rotational axis and a front side. A plurality of blades are each attached to the blade rotor hub and include a non-conductive portion proximate the blade rotor hub and at least one conductive portion radially outward from the rotational axis beyond the non-conductive portion. A lightning conductive path extends from the at least one conductive portion of each of the plurality of blades to an electrical ground when the wind turbine is grounded to the electrical ground. The lightning conductive path includes an electrical hub at least partially located on the front side of the blade rotor hub and is spaced from the blade rotor hub.

BRIEF DESCRIPTION OF THE DRAWINGS

For the purpose of illustrating the invention, the drawings show a form of the invention that is presently preferred. However, it should be understood that the present invention is not limited to the precise arrangements and instrumentalities shown in the drawings, wherein.

DETAILED DESCRIPTION

Figure 1:
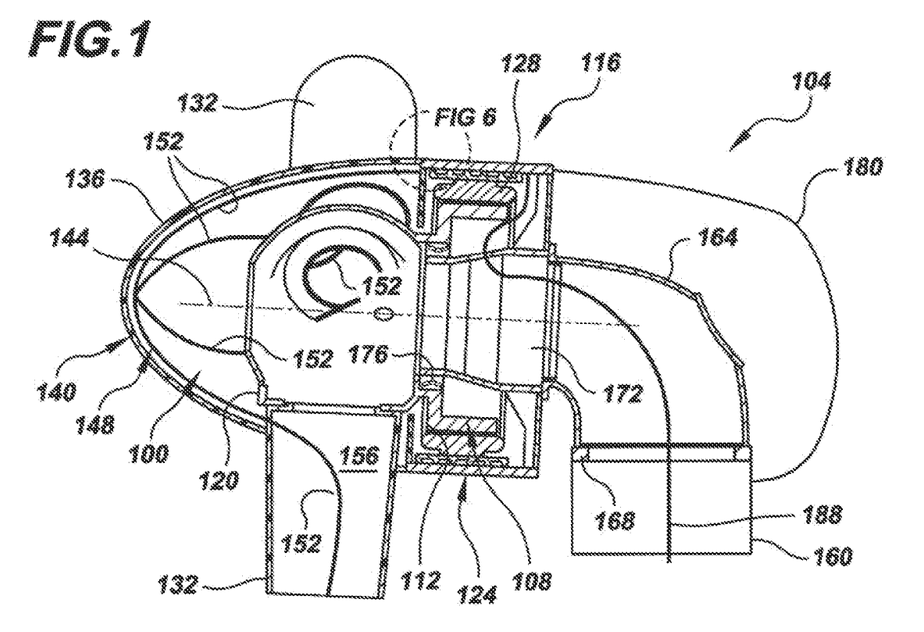
FIG. 1 is a cross-sectional view of a portion of a direct-drive type wind turbine that includes a lightning protection system of the present invention.

Referring now to the drawings, FIG. 1 shows in accordance with the present invention a lightning protection system 100 incorporated into a direct drive wind turbine 104. Wind turbine 104 generally comprises a direct-drive drivetrain 108 that includes the rotor 112 of an electrical generator 116 and a blade rotor hub 120 fixedly attached to the generator rotor, in this case on the down-wind side of the blade rotor hub. Generator 116 may also include a generator housing 124 that encloses the main components of generator 116, such as generator rotor 112 and the stator 128. Blade rotor hub 120 supports a plurality of blades 132 and may, but not necessarily, be enclosed by a nose cone 136. The combination of blade rotor hub 120, blades 132 and nose cone 136 may be referred to as a "blade rotor" 140, which is rotatable relative to generator housing 124 and other components of wind turbine 104 about a rotational axis 144 by action of wind on the blades.

Due to the large loads that blade rotor hub 120 and generator rotor 112 are subject to particularly during operation of wind turbine 104, these components are typically made of metal, which, of course, is a good electrical conductor. Unfortunately, the fact that blade rotor hub 120 and generator rotor 112 are often good electrical conductors can be detrimental to generator 116, since without a lightning protection system a lightning strike to wind turbine 104, e.g., a strike to any one of blades 132, nose cone 136 and blade rotor hub 120, can be readily transmitted through the generator on its way to the ground. Stator 128 typically has wires (not shown) having thin insulation and would be easily damaged by a lightning strike of this type. This is an undesirable situation, since the cost of repairing or replacing generator 116 is relatively very expensive and time consuming.

Broadly speaking, lightning protection system 100 includes components that inhibit lightning strikes to blades 132 and the region surrounding blade rotor hub 120 from reaching the blade rotor hub and generator rotor 112. Rather, the electrical energy from such lightning strikes is essentially routed so as to bypass blade rotor hub 120 and generator rotor 112, thereby lessening the likelihood that generator 116 will be damaged by a lightning strike. One component of lightning protection system 100 is a conductive "electrical hub" 148 that largely envelopes blade rotor hub 112, generally except in the region where the blade rotor hub is joined to generator rotor 112. As discussed below, electrical hub generally conduct a lightning strike to any one or blades 132 or in the region surrounding blade rotor hub 120 around the blade rotor hub on a least resistance path to ground (not shown) that does not include the blade rotor hub and generator rotor 112.

Electrical hub 148 may take any of a variety of forms. For example, in the embodiment shown in FIG. 1, electrical hub 148 comprises a plurality of elongate electrical conductors, e.g., cables 152 that generally cross each other and are located in close proximity to one another in front of blade rotor hub 120, in this case the upwind side of the blade rotor hub, but are spaced from the blade rotor hub by a distance at which arcing between the electrical hub and blade rotor hub is not likely to occur. Examples of other elongate electrical conductors include rods, bars and tubes, among others. Typically, the spacing between any portion of electrical hub 148 and blade rotor hub should be greater than about 100 mm. Cables 152 may be in contact with, or attached to, one another where they cross so as to provide multiple conductive paths for a single lightning strike. In other embodiments, electrical hub 148 may be integrated with nose cone 136. In embodiments wherein electrical hub 148 is not integrated with nose cone 136, the nose cone may be eliminated altogether, though the aerodynamics of wind turbine 104 may be somewhat compromised.

Figure 2A:
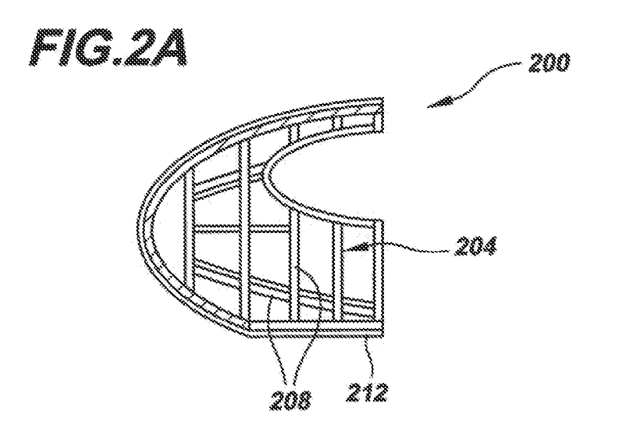
FIG. 2A is a cross-sectional view of a nose cone of the present invention having an integrated electrical hub suitable for use in a lightning protection system of the present invention.
Figure 2B:
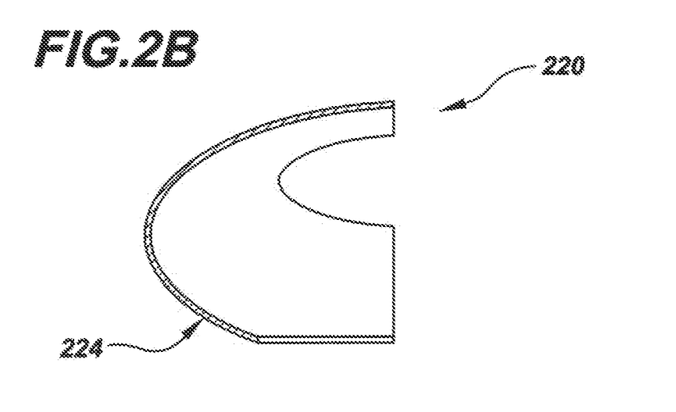
FIG. 2B is a cross-sectional view of an alternative nose cone of the present invention having an integrated electrical hub suitable for use in a lightning protection system of the present invention.
Figure 2C:
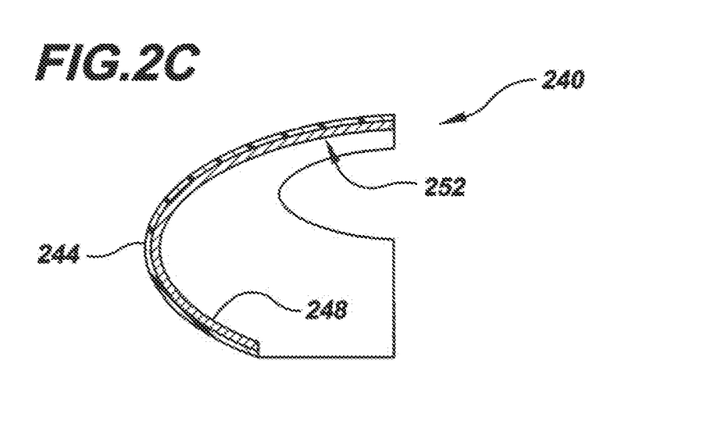
FIG. 2C is a cross-sectional view of another alternative nose cone of the present invention having an integrated electrical hub suitable for use in a lightning protection system of the present invention.

Electrical hub 148 may be integrated with nose cone 136 in a variety of ways. For example, as shown in FIG. 2A, nose cone 200 may include an electrical hub 204 that also functions as a support structure 208 for a skin 212 made of either a nonconductive material, e.g., fiberglass, or a conductive material, such as aluminum. Referring to FIG. 2B, in other embodiments a large portion nose cone 220 may be made of a relatively thick (relative to skin of FIG. 2A) conductive material, such that this entire portion of the nose cone functions as an electrical hub 224. In yet other embodiments, as illustrated in FIG. 2C, nose cone 240 may include at least one nonconductive layer 244, e.g., an outer protective layer, and at least one conductive layer 248, e.g., an inner layer, that functions as electrical hub 252. Each conductive layer 248 may be, e.g., a solid body of conductive material or a mesh of conductive material, among other things. It is noted that in each of the nose cones 200, 220, 240 of FIGS. 2A-2C, the conductive portions (204, 220, 248, respectively) of the respective nose cones must be electrically insulated from the corresponding blade rotor hub (not shown) in a suitable manner. Those skilled in the art understand how to achieve such electrical insulation.

Figure 3A:
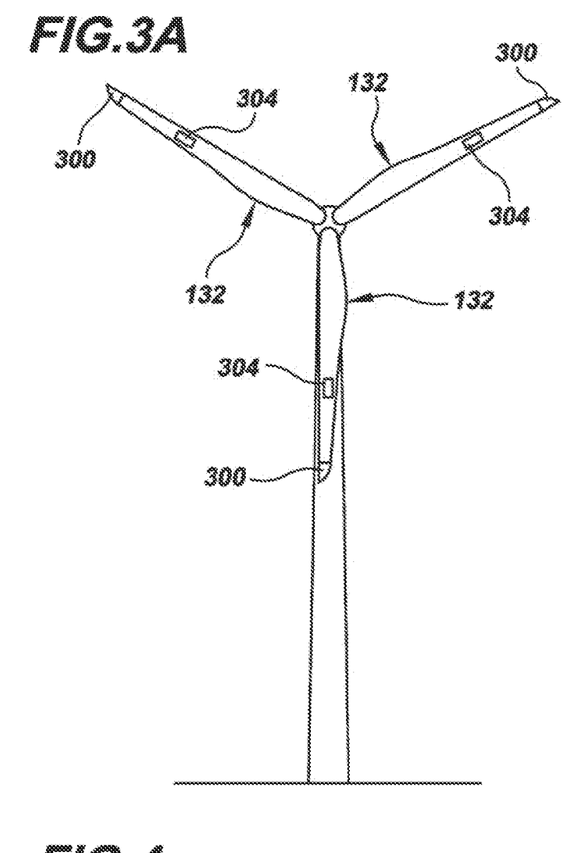
FIG. 3A is a reduced front elevational view of the wind turbine of FIG. 1A.

Referring again to FIG. 1, electrical hub 148 is suited for attracting lightning strikes in the vicinity of nose cone 136. However, blades 132 are, of course, also susceptible to lightning strikes. Consequently, it is beneficial that lightning protection system 100 include components for safely attaching lightning strikes to blades 132 and conducting the strikes to electrical hub 148. Referring to FIG. 1 and also to FIG. 3A, each blade 132 may be made largely of a non-conductive material, typically, a fiberglass composite or wood, but have one or more strike elements, e.g., conductive tips 300 and/or conductive plates 304, located at the tips of the blades and/or at other locations along the lengths of the blade as desired to suite a particular design. Each of these strike elements 300, 304 is electrically coupled with electrical hub 148, in this example, by the same cables 152 that form the electrical hub. If multiple strike elements 300, 304 are provided for each blade 132, such as shown, each such element on a particular blade can be electrically connected to a single corresponding conductor, e.g., cable 152, or multiple conductors (not shown) that are in turn electrically coupled to electrical hub 148. Cables 152, or other conductors may be located within the corresponding blades 132, e.g., within central cavities 156 formed within the blades.

Whether or not each cable 152 or other conductor can be continuous through the corresponding blade 132 and to electrical hub 148 typically depends upon a number of factors, including whether or not the blades have a fixed or variable pitch and, if variable pitch, the range of pitch, the flexibility of the conductors used, the size of the space(s) between nose cone 136 and blade rotor hub 120, and the clearance(s) between the nose cone and blade rotor hub. For example, if each blade 132 has a fixed pitch, it is likely that cables 152, or other conductors, can be continuous regardless of their flexibility. On the other hand, if each blade 132 has a variable pitch with a wide range of pitch and cables 152, or other conductors, are relatively stiff, it is likely that the cables cannot be continuous.

Figure 4:
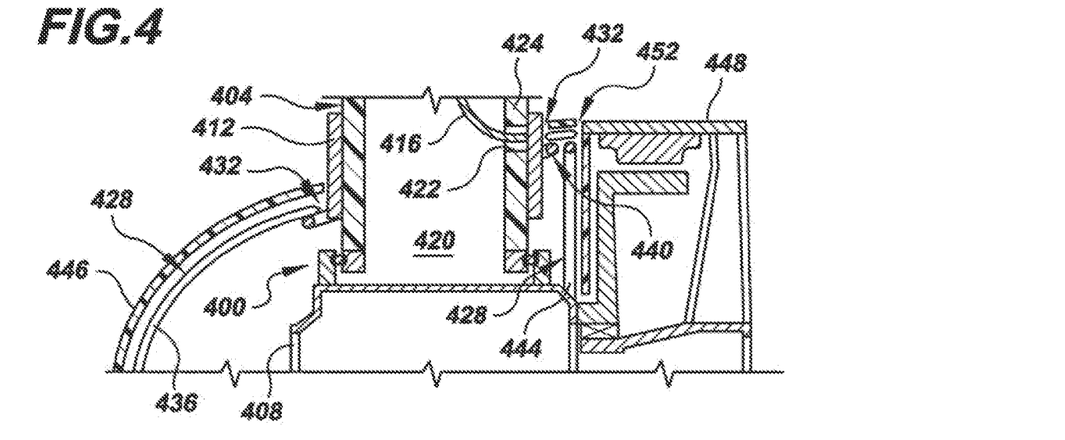
FIG. 4 is a cross-sectional view of a variable pitch blade spark gap joint forming part of a lightning protection system of the present invention.

If cables 152 are too stiff to be continuous, it may be necessary to split the cables at the pivotable variable pitch joint and provide slip rings, spark gaps or other type of rotational conductive paths between the movable blades and the blade rotor hub. For example, FIG. 4 illustrates a pivotable variable pitch joint 400 that may be provided so as to permit a blade 404 to be pivoted relative to a blade rotor hub 408 so that the pitch of the blade can be changed to control the performance of the corresponding wind turbine (not shown). In order to provide electrical continuity between the strike element(s) (not shown) or other conductive portion(s) of each blade 404, each blade may include a blade ring 412 that is electrically coupled to the strike element(s)/conductive portion(s), e.g., via a conductive blade cable 416. As shown, blade cable 416 is located within a cavity 420 inside the blade 404. In this case, blade cable 416 may extend through an aperture 422 in a nonconductive portion 424 of blade 404. In alternative embodiments, blade cable(s) or other conductors may be located on the exterior of blade 404. Blade ring 412 may be in electrical communication with an electrical hub 428 via one or more spark gaps 432.

As with electrical hub 148 described above, electrical hub 428 of FIG. 4 may substantially surround blade rotor hub 408 and be suitably spaced therefrom, and may comprise a plurality of conductors, e.g., cables 436, 440, 444 electrically coupled with one another so as to form a conductive mesh or cage, or, alternatively, may be a solid body (not shown), e.g., as shown for nose cones 220, 240 of FIGS. 2B and 2C, respectively. Those skilled in the art will readily appreciate that there will generally be a plurality of cables 436 that cross over one another in front of blade rotor hub 408 in a manner similar to the manner shown in FIG. 1. Cables 436 may, but need not, follow the contour of nose cone 446, and some of these cables may be terminated proximate blade ring 412 as shown, or, alternatively, may be routed around a corresponding blade ring or routed on one lateral side or the other of that blade ring. Cable 440, which may be in the shape of a ring, may encircle blade ring 412 so as to provide a conductive path around blade 404. Of course, a similar cable 440 may be provided for each other blade of the wind turbine that is not shown in FIG. 4.

Electrical hub 428 may be in electrical communication with generator housing 448 or other grounded conductive structure electrically located between the electrical hub and the ground (not shown), e.g., via one or more spark gaps 452. Correspondingly, cable 444, which forms a ring, may be present so as to provide electrical continuity between adjacent spark gaps 452 in the event that one spark gap provides lower resistance that the others. The function of cable 444 is the same as the function of conductive ring 616 of FIG. 6 that is described below. With the configuration of blade ring and electrical hub 428 shown, a lightning strike to one of the blade strike elements will be conducted through blade cable 416 into blade ring 412, across the one or more spark gaps 432 into electrical hub 428, and then across the one or more spark gaps 452 on its way to ground. A lightning strike striking electrical hub 428 directly, will be conducted through the electrical hub and then across the one or more spark gaps 452.

Figure 5A:
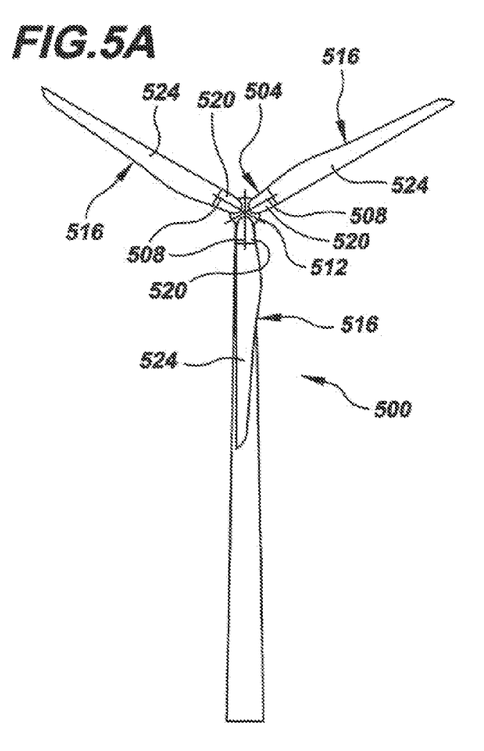
FIG. 5A is a front elevational view of another direct-drive wind turbine incorporating a lightning protection system of the present invention.
Figure 5B:
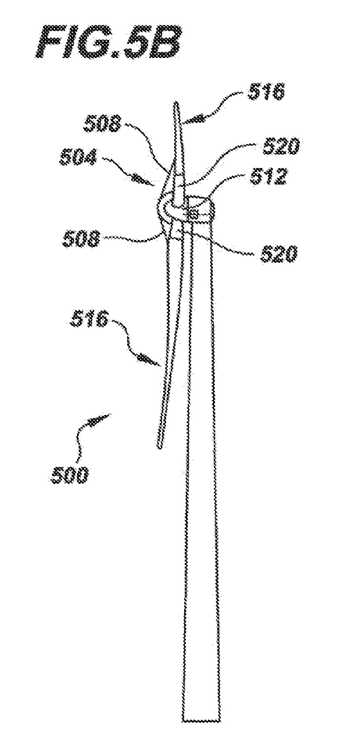
FIG. 5B is a side elevational view of the wind turbine of FIG. 5A.

FIGS. 5A and 5B illustrate a wind turbine 500 having an alternative lightning protection system 504 of the present invention. Lightning protection system 504 has two primary differences relative to lightning protection system 100 discussed above. First, instead of having lightning conducting cables 508, or other conductors, routed between the nose cone 512 and blade rotor hub (not shown) in a manner similar to lightning protection system 100, lightning protection system 504 of FIGS. 5A and 5B are routed outside of the nose cone. Second, in lieu of relatively small lightning strike elements like strike elements 300, 304 of FIGS. 3A and 3B, lightning protection system 504 of FIGS. 5A and 5B includes blades 516 that are conductive along substantially their entire lengths, except for small portions 520 proximate the blade rotor hub that insulate the blade rotor hub from the conductive portions 524. Conductive portions 524 may be made of any suitable material, such as aluminum. Cables 508 are electrically coupled to conductive portions 524 and may be routed, e.g., either on the outside of blades 516 as shown or, alternatively, inside the blades. If cables 508 are run through the inside blades 516, they may emerge from the blades, e.g., within non-conductive portions 520.

Figure 3B:
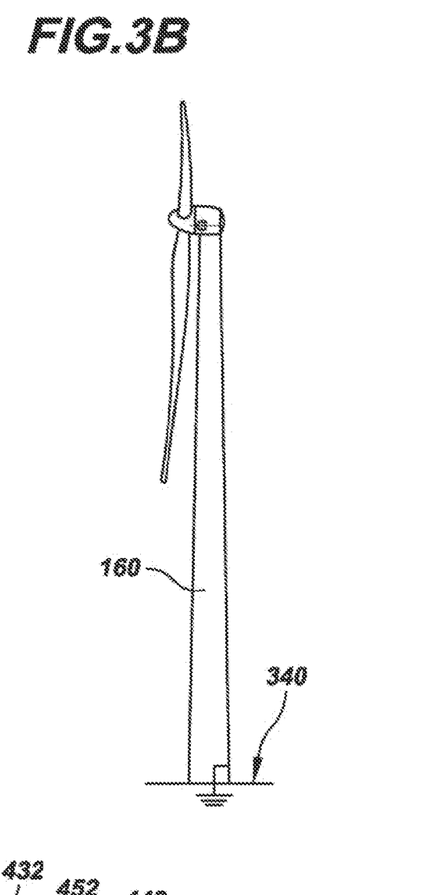
FIG. 3B is a reduced side elevational view of the wind turbine of FIG. 1A.

Referring again to FIG. 1, and also to FIG. 3B, electrical hub 148 may be electrically coupled to the ground 340 (FIG. 3B) in any of a variety of ways, one of which is illustrated in FIGS. 1 and 3B. In the embodiment shown, direct drive wind turbine 104 generally includes a tower 160 that engages ground 340 and supports a turret 164 via a yaw bearing 168. Turret 164, in turn, supports a blade rotor hub support 172, as well as generator housing 124, which supports stator 128. Blade rotor hub 120 and generator rotor 112 are supported by a main turbine bearing 176. In the present example, generator housing 124, blade rotor hub support 172, turret 164 and tower 160 are all made of conductive metal due to the large loads that these components must carry and the efficiency of metal to carry these loads at a relatively low cost. Consequently, a suitable conductive path for lightning protection system 100 to conduct lightning striking any one of blades 132 and the region surrounding blade rotor hub 120 may include generator housing 124, turret 164 and tower 160. It is noted that in the present embodiment blade rotor hub 120 and generator rotor 112 are connected to the ground via main turbine bearing 176, but are not in the least-resistance path from electrical hub 148 to ground 340, and thus are protected from damage. In alternative embodiments, blade rotor hub 120 and generator rotor 112 may be electrically insulated from ground 340 by using suitable non-conductive components for main bearing 176.

Figure 6:
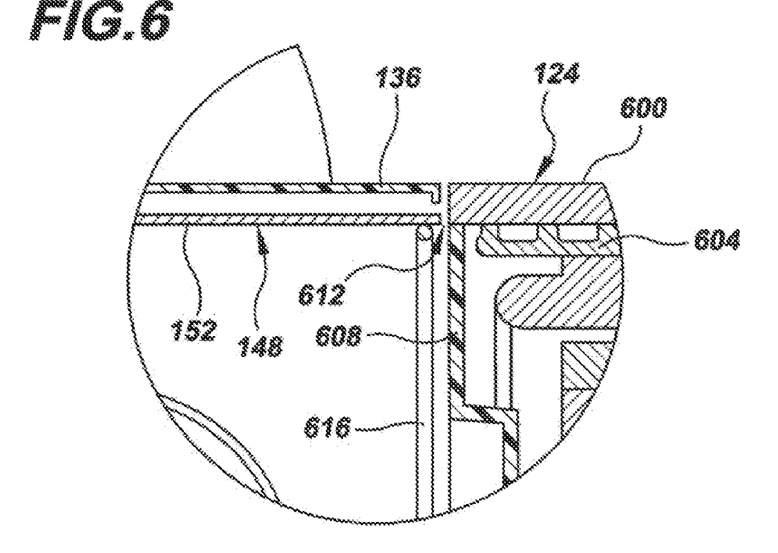
FIG. 6 is an enlarged cross-sectional view showing one of the spark gaps between the lightning protection rotor cables and generator housing as taken from FIG. 1.

Referring to FIGS. 1 and 6, to electrically couple electrical hub 148 to generator housing 124, cables 152 of the electrical hub may be extended to a location proximate the generator housing. Of course, in alternative embodiments, one or more additional electrical conductors (not shown) may be provided in lieu of extending cables 152, especially if electrical hub 148 is integrated into nose cone 136 or is otherwise in a form in which the conductors therein are not suited to merely extending.

Referring particularly to FIG. 6, generator housing 124 generally comprises an outer frame 600, a water jacket 604 and a front cover 608. Each cable 152 may be terminated in such proximity to generator housing 124, e.g., to outer frame 600, so as to create a corresponding spark gap 612 between that cable and the outer frame of the housing. The termination of each cable 152 should, but need not, include a sharp edge to help initiate a spark. Each spark gap 612 should generally be as small as practicable, typically on the order of a few millimeters. The tolerances required to achieve such small spark gaps 612 are sometimes difficult to achieve during manufacture. Consequently, cables 152 may optionally be electrically connected to a conductive ring 616 that may form part of electrical hub 148 and can direct current from a lightning strike to the one(s) of spark gaps 612 having the smallest gap, e.g., the least electrical resistance. When conductive ring 616 is present, manufacturing tolerances can be larger than if a single spark gap 612 were relied upon for any given blade cable 152. Conductive ring 616 may be made of any suitable conductive element(s), such as a bar, rod or cable, among others. As those skilled in the art will readily appreciate, spark gaps 612 may be replaced by a conventional slip ring (not shown) or other rotational conducting paths.

Referring again to FIGS. 1 and 3B, once a lightning strike is conducted into generator housing 124 from electrical hub 148, it passes through mechanical connections of the housing to turret 164. From there, the electrical current may be conducted through or around yaw bearing 168 into tower 160. This may be done, e.g., via conventional slip rings, spark gaps, or through yaw bearing 168 directly. Since the means for conducting a lightning strike through or around yaw bearing 168 is well known in the prior art, it is not shown in the figures. Once the lightning strike is conducted into tower 160, it is connected to ground 340 using conventional means, which are also well known in the prior art and, therefore, are not shown. Alternatively, the lightning strike may be conducted from generator housing 124 to a conductive nacelle 180 that in turn conducts the lightning strike to tower 160 via conventional means. It is noted that a present design has a multiple-conductor power cable 188 extending from generator 116 into hollow turret 164, which substantially shields the power cable from the lightning strike.

An attribute of lightning protection system 100 is that it works whether or not generator rotor 112 and blade rotor hub 120 are connected to ground 340. Damage to generator 116 from a lightning strike occurs when the path to ground 340 with the least resistance goes across the gap between generator rotor 112 and stator 128. Damage to bearings, e.g., of main bearing 176, or gears (not shown) of a gearbox (see, e.g., gearbox 708 of FIG. 7) occurs when the least resistance path to ground 340 passes through them. All of these components can be connected to ground 340 as long as they are not on the lowest-resistance path from the strike point to ground. For lightning strikes, the current can be visualized as charged particles that have a repulsive force. Thus the charged particles and current tend to spread out over a conductive mesh or shell, such as the mesh formed by cables 152 of electrical hub 148, the shell formed by generator housing 124 or the shell formed by conductive nacelle 180. The charged particles and current tend not to flow toward the center of the conductive mesh or shell. Thus, with electrical hub 148 present, blade rotor hub 120 and generator rotor 112 are protected from the lightning strike.

Figure 7:
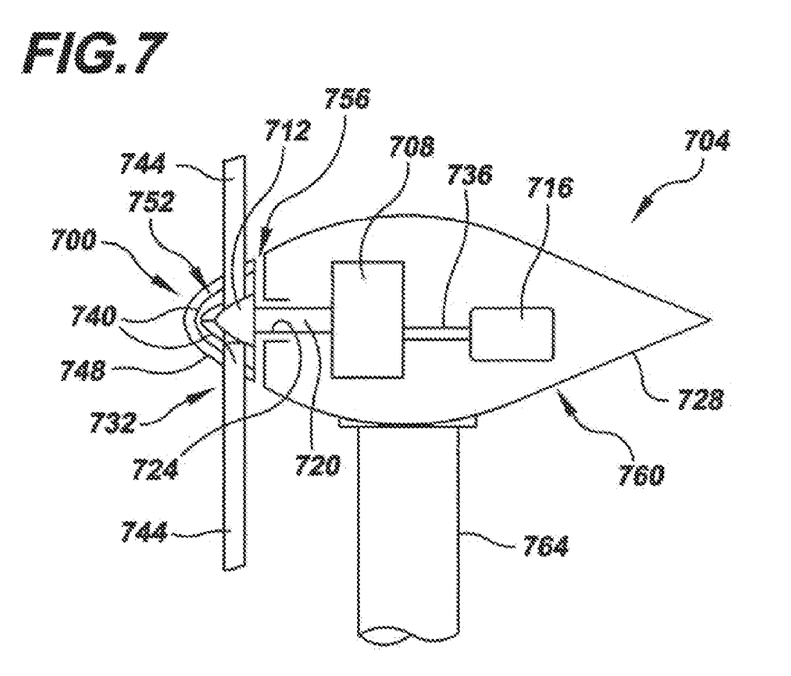
FIG. 7 is a partial cross-sectional view/partial schematic diagram of a gearbox type wind turbine that includes a lightning protection system of the present invention.

A lightning protection system of the present invention may be applied to turbine types other than direct drive turbines. For example, FIG. 7 illustrates an alternative lightning protection system 700 of the present invention incorporated into a wind turbine 704 having a gearbox 708 located between the blade rotor hub 712 and electrical generator 716. In this example, blade rotor hub 712 is fixedly supported by a main turbine shaft 720, which is rotatable supported by a main bearing 724. Main bearing 724, main turbine shaft 720, gearbox 708 and generator 716 are all enclosed within a nacelle 728. Even though generator 716 can be well protected from lightning strikes to the blade rotor 732 by providing an insulating shaft connection 736 between gearbox 708 and the generator, main bearing 724 and the gearbox are often inadequately protected. Lightning strikes frequently cause pitting of bearing and gear surfaces that significantly reduces the fatigue life of these components.

Lightning protection system 700 may be largely similar to lightning protection system 100 discussed above. For example, lightning protection system 700 may include a plurality of conductive cables 740, or other conductors, extending from blades 744 to a location proximate the downwind end of nose cone 748 and crossing one another so as to form an electrical hub 752. However, instead of each cable 740 forming a spark gap with a generator housing as in lightning protection system 100, each cable forms a spark gap 756 with conductive nacelle 728 or other conductive structure that may be present on the "head unit" 760 of wind turbine 704. From nacelle 728, a lightning strike may be conducted to tower 764 and ground (not shown) in any conventional manner, such as the slip ring, spark gap and bearing manners discussed above in connection with lightning protection system 100. Although not shown, other aspects of lightning protection system 700, such as strike elements for blades, may be identical to strike elements shown and describe in connection with lightning protection system 100.

In addition to the advantages discussed above, another advantage of a lightning protection system of the present invention, such as any of lightning protection systems 100, 504, 700, is that it is fully functional while the blades of the wind turbine are rotating, but it also has equal functionality when the blades stopped.

Although the invention has been described and illustrated with respect to an exemplary embodiment thereof, it should be understood by those skilled in the art that the foregoing and various other changes, omissions and additions may be made therein and thereto, without parting from the spirit and scope of the present invention.

What is claimed is:

1. A wind turbine, comprising:
  a) a wind rotor comprising a wind rotor hub and a plurality of blades attached to the wind rotor hub, said wind rotor hub having a rotational axis and first and second sides spaced from each other along said rotational axis, each of said plurality of blades including a non-conductive portion proximate said blade rotor hub and at least one conductive portion radially outward from said rotational axis beyond said non-conductive portion;
  b) an electrically grounded structure located on said second side of said wind rotor hub and stationary about said rotational axis when said wind rotor is in use; and
  c) a lightning conducting path of least electrical resistance extending from said at least one conductive portion of each of said plurality of blades to said electrically grounded structure, said lightning conducting path spaced from said wind rotor hub so as to inhibit arcing between said lightning conducting path and said wind rotor hub.

2. A wind turbine according to claim 1, wherein said lightning conductive path includes an electrical hub located at least partially on said first side of said wind rotor hub.

3. A wind turbine according to claim 2, wherein said electrical hub comprises a plurality of elongate electrical conductors.

4. A wind turbine according to claim 3, wherein said elongate conductive structures are cables.

5. A wind turbine according to claim 2, wherein said electrical hub comprises a conductive ring located proximate said electrically grounded structure.

6. A wind turbine according to claim 2, further comprising a nose cone substantially enclosing said wind rotor hub, said nose cone integrating said electrical hub.

7. A wind turbine according to claim 1, wherein said lightning conductive path includes a plurality of elongate electrical conductors corresponding respectively to said plurality of blades, each said plurality of elongate electrical conductors having a first end in electrical communication with said at least one conductive portion of the corresponding one of said plurality of blades and a second end located proximate said electrically grounded structure.

8. A wind turbine according to claim 7, wherein each of said plurality of elongate electrical conductors is a cable.

9. A wind turbine according to claim 7, wherein said plurality of elongate electrical conductors at least partially form an electrical hub that extends partially around said wind rotor hub.

10. A wind turbine according to claim 9, wherein said plurality of elongate electrical conductors cross one another on said first side of said wind rotor hub.

11. A wind turbine according to claim 9, wherein said plurality of elongate electrical conductors are electrically coupled with one another.

12. A wind turbine according to claim 9, wherein said electrical hub comprises a conductive ring located proximate said electrically grounded structure.

13. A wind turbine according to claim 1, wherein said electrically grounded structure is a generator housing.

14. A wind turbine according to claim 1, wherein said electrically grounded structure is a nacelle.

15. A wind turbine according to claim 1, wherein said electrically grounded structure is a generator support structure.

16. A wind turbine according to claim 1, wherein said lightning conducting path comprises at least one spark gap between said wind rotor and said grounded structure.

17. A wind turbine according to claim 16, wherein said lightning conducting path further comprises at least one elongate electrical conductor having an end that forms part of said at least one spark gap.

18. A wind turbine according to claim 1, wherein said lightning conducting path comprises a plurality of spark gaps located proximate said electrically grounded member and arranged so that at least one of said plurality of spark gaps will conduct a lightning strike regardless of the deflection of said wind rotor.

19. A wind turbine according to claim 1, wherein each of said plurality of blades has a length and comprises a plurality of conductive portions spaced from one another along said length.

20. A wind turbine according to claim 1, wherein said wind rotor further comprises a nose cone and said lightning conducting path comprises an electrical hub located between said blade rotor hub and said nose cone.

21. A wind turbine according to claim 1, wherein said lightning conducting path comprises an electrical hub and said wind rotor further comprises a nose cone located between said electrical hub and said blade rotor hub.

22. A wind turbine, comprising:
   a) a blade rotor hub having a rotational axis and a front side;
   b) a plurality of blades each attached to said blade rotor hub and including a non-conductive portion proximate said blade rotor hub and at least one conductive portion radially outward from said rotational axis beyond said non-conductive portion; and
   c) a lightning conductive path extending from said at least one conductive portion of each of said plurality of blades to an electrical ground when the wind turbine is grounded to the electrical ground, said lightning conductive path including an electrical hub at least partially located on said front side of said blade rotor hub and spaced from the blade rotor hub.

* * * * *